United States Patent

Wada

Patent Number: 5,602,735
Date of Patent: Feb. 11, 1997

[54] CONTROL APPARATUS FOR MOTOR-DRIVEN POWER STEERING SYSTEM IN WHICH POWER SUPPY TO AN ELECTRIC CLUTCH IS REDUCED UPON DETECTION OF A MALFUNCTION

[75] Inventor: Shunichi Wada, Himeji, Japan

[73] Assignee: Mitsubishi Denki Kabushiki Kaisha, Tokyo, Japan

[21] Appl. No.: 322,544

[22] Filed: Oct. 13, 1994

[30] Foreign Application Priority Data

Oct. 26, 1993 [JP] Japan ..................... 5-267453

[51] Int. Cl.$^6$ .................................... B62D 5/04
[52] U.S. Cl. .................... 364/424.051; 180/446
[58] Field of Search ............... 364/424.05; 180/79.1, 180/140, 141, 142, 143

[56] References Cited

U.S. PATENT DOCUMENTS

| | | | |
|---|---|---|---|
| 4,660,671 | 4/1987 | Behr et al. ............ | 180/142 |
| 4,753,310 | 6/1988 | Hashimoto ............ | 180/79.1 |
| 4,849,889 | 7/1989 | Morishita et al. ..... | 364/424.05 |
| 4,918,744 | 4/1990 | Shimizu ................ | 180/79.1 X |
| 4,972,133 | 11/1990 | Hirota et al. .......... | 180/142 X |
| 4,984,647 | 1/1991 | Morishita et al. ..... | 180/79.1 |
| 5,040,630 | 8/1991 | Morishita et al. ..... | 180/79.1 |
| 5,240,445 | 8/1993 | Aoki et al. ............. | 180/79.1 X |
| 5,299,650 | 4/1994 | Wada et al. ........... | 180/79.1 |
| 5,341,891 | 8/1994 | Wada et al. ........... | 180/79.1 |
| 5,414,627 | 5/1995 | Wada et al. ........... | 364/424.05 |

FOREIGN PATENT DOCUMENTS

| | | |
|---|---|---|
| 0247736 | 12/1987 | European Pat. Off. . |
| 4023812 | 7/1990 | Germany . |
| 4027217 | 3/1991 | Germany . |
| 4230516 | 9/1992 | Germany . |
| 4231328 | 9/1992 | Germany . |

OTHER PUBLICATIONS

Patent Abstract of Japan vol. 017 No. 569, Jun. 29, 1993, JPA–05–162647.
Patent Abstract of Japan vol. 015 No. 329, May 29, 1991, JPA–3–125667.

*Primary Examiner*—Collin W. Park
*Attorney, Agent, or Firm*—Sughrue, Mion, Zinn, Macpeak & Seas

[57] ABSTRACT

A control apparatus for a motor-driven power steering system of a motor vehicle for preventing generation of actuation noise of a clutch without sacrificing reliability of the steering system. A current calculating/driving means 91 calculates a motor current command value $I_0$ on the basis of a vehicle speed V and a steering torque T for driving a motor 13. An abnormal torque decision reference value arithmetic means 901 calculates an abnormal torque decision reference value $T_0$ and a reference time $t_0$ in dependence on the vehicle speed V, while a load torque calculating means 902 calculates a load torque $T_L$ on the basis of the steering torque T and the motor current command value $I_0$. A motor rotation decision means 907 estimates a rotation number $N_M$ of the motor 13 from a motor regeneration voltage. When the load torque $T_L$ is greater than the abnormal torque decision reference value $T_0$ and when a duration $t_L$ thereof is greater than the reference time $t_0$, power supply to the motor 13 is interrupted under the control of a motor fault monitor/control means 904, provided that the rotation number $N_M$ is not greater than a motor stop decision reference rotation number $N_0$. A clutch control means 92B is also so controlled that the steering torque T becomes equal to a preset torque limitation triggering value $T_1$ so that the steering can be performed without encountering any appreciable obstacle.

48 Claims, 7 Drawing Sheets

CONTROL APPARATUS FOR MOTOR-DRIVEN POWER STEERING SYSTEM IN WHICH POWER SUPPY TO AN ELECTRIC CLUTCH IS REDUCED UPON DETECTION OF A MALFUNCTION

BACKGROUND OF THE INVENTION

1. Field of the Invention

The present invention generally relates to a motor-driven power steering system of a motor vehicle or automobile which is adapted for assisting a driver in manipulating a steering wheel or handle by making use of an assist torque generated by a reversible motor which is operatively coupled to the steering system. In particular, the invention is concerned with a control apparatus for the motor-driven power steering system which allows smooth transition of steering operation from a motor-aided mode to a manual mode when a fault or abnormality occurs in the assist torque generating motor or other parts. The invention is also concerned with an apparatus for controlling an electromagnetic clutch through which an assist torque generated by the motor is transmitted to the steering system such that a coupling effort of the clutch decreases continuously to a level allowing the manual operation of the steering wheel upon occurrence of abnormality in the motor. The combination of the motor-driven power steering system and the control apparatus may also be referred to as the motor-driven power steering control system.

2. Description of the Related Art

For better understanding of the present invention, description will first be directed to a motor-driven power steering control system known heretofore. FIG. 6 is a schematic diagram showing a general arrangement of a conventional motor-driven power steering control system described in, for example, Japanese Unexamined Patent Application Publication No. 255273/1987 (JP-A-62-255273) or Japanese Unexamined Patent Application Publication No. 215461/1988 (JP-A-63-215461).

Referring to the figure, a steering mechanism is comprised of a steering wheel 1 to which a steering torque is applied by a driver of the motor vehicle (not shown), a steering shaft assembly 2 for transmission of the steering torque, universal joints 4 provided for operatively coupling the individual shafts of the steering shaft assembly 2, a pinion shaft 5 provided at a bottom end of the steering shaft assembly 2, and a rack 6 disposed to mesh with the pinion shaft 5. A steering torque sensor 3 is provided in association with the steering shaft assembly 2 for detecting a steering torque T transmitted there through. Further, a steering speed sensor 7 is provided for detecting a steering speed A at which the steering wheel 1 is manipulated by the driver.

For the purpose of controlling the steering mechanism, there is provided a control apparatus 9 which includes a microcomputer for controlling an electric motor (or reversible motor) 13 and others in a manner which will be elucidated later on. A vehicle speed sensor 10 is provided for inputting a vehicle speed V to the control apparatus 9. A power source for the control apparatus 9 and the electric motor 13 is constituted by an onboard battery 11, wherein a key switch 12 is interposed between the control apparatus 9 and the battery 11. The power supplied to the electric motor 13 is controlled by the control apparatus 9. To this end, an electromagnetic clutch 14 is disposed at the output side of the electric motor 13 and adapted to be controlled by the control apparatus 9. The electromagnetic clutch 14 has an output shaft coupled operatively to a worm shaft 15 which constitutes a part of a reduction gear unit. Provided so as to mesh with the worm shaft 15 is a worm wheel 16 meshing with a pinion shaft 18 which in turn meshes with the rack 6.

As is apparent from the above description, the electric motor 13 is operatively coupled to the steering mechanism via the electromagnetic clutch 14 for generating a steering assist torque which is applied to the steering mechanism.

FIG. 7 is a functional block diagram showing a configuration of the control apparatus 9. As can be seen in the figure, the control apparatus 9 is comprised of a current calculating/driving means 91 for calculating a motor current command value $I_0$ on the basis of the steering torque T and the vehicle speed V to thereby drive the electric motor 13 on the basis of the motor current command value $I_0$, a clutch control means 92 for changing over a clutch control signal C for the electromagnetic clutch 14 from an ON-level to an OFF-level when the vehicle speed V attained a predetermined reference vehicle speed $V_0$ (e.g. 50 km/h), and a motor current detecting means 93 which serves for detecting an actual motor current I of the motor 13, wherein the signal indicative of the actual motor current I is supplied to the current calculating/driving means 91.

With the arrangement of the control apparatus 9 described above, the control apparatus 9 controls a voltage applied to the electric motor 13 so that a current corresponding to the motor current command value $I_0$ flows through the electric motor 13 by monitoring the actual motor current I as detected and fed back. On the other hand, the clutch control means 92 is adapted for interrupt (i.e., turn off) the clutch control signal C when occurrence of a fault in a low-speed operation range of the motor vehicle is determined on the basis of detection signals available from outputs of the relevant sensors (not shown) which the motor vehicle is equipped with. Incidentally, the motor current detecting means 93 may be constituted by, for example, a resistor having one end grounded.

FIG. 8 is a view for illustrating changes in the clutch control signal C and the motor current command value $I_0$. As is shown at (a) in FIG. 8, the clutch control signal C is at the ON-level (indicating the clutch current on the order of e.g. 1 ampere) when the vehicle speed V is lower than the predetermined reference vehicle speed $V_0$ and changed over to the OFF-level (i.e., the level corresponding to zero clutch current) when the vehicle speed V is higher than the predetermined reference vehicle speed $V_0$ inclusive thereof. Further, as shown at (b) in FIG. 8, the motor current command value $I_0$ is so changed as to increase when the vehicle speed V decreases or as the steering torque T increases so long as the vehicle speed V is lower than the predetermined reference vehicle speed $V_0$ and is interrupted (i.e., set to zero level) when the vehicle speed V is higher than the predetermined reference vehicle speed $V_0$ inclusive thereof. In general, the steering wheel 1 is heavy to steer (i.e., the steering torque T as required is large) when the motor vehicle is driven at a low speed, while the steering wheel 1 is easy to steer (i.e., the steering torque T as demanded is low) when the motor vehicle is running at a high speed, even though it also depends on the road conditions more or less*. Accordingly, the steering assist torque is increased as the vehicle speed V becomes lower.

Next, referring to FIG. 8, description will turn to operation of the motor-driven power steering control system shown in FIGS. 6 and 7.

In the course of a low-speed running of the motor vehicle in which the vehicle speed V is lower than the predetermined reference vehicle speed $V_0$, the clutch control means 92 incorporated in the control apparatus 9 maintains the clutch control signal C at the ON-level to allow the electromagnetic clutch 14 to be operatively coupled to the electric motor 13. Further, the current calculating/driving means 91 generates a signal indicating the motor current command value $I_0$ determined on the basis of the vehicle speed V outputted from the vehicle speed sensor 10 and the steering torque T derived from the steering torque sensor 3 to thereby drive the electric motor 13 so that a steering assist torque as required is generated by the electric motor 13.

More specifically, because the steering torque T of greater magnitude is required as the vehicle speed V is lower, the motor current command value $I_0$ which determines ultimately the steering assist torque is set at a correspondingly large value. Further, when a greater steering torque is required in dependence on the road conditions, the motor current command $I_0$ is set to a correspondingly large value.

In this way, magnitude of the steering torque T which the driver is demanded to apply to the steering wheel can be maintained substantially or approximately constant regardless of the running conditions of the motor vehicle.

Incidentally, when occurrence of a fault in the system is detected in the course of driving the motor vehicle, the clutch control means 92 interrupts the clutch control signal C to thereby disconnect the electromagnetic clutch 14 from the electric motor 13 in order to ensure safety for the steering operation. In this conjunction, occurrence of fault or abnormality can be decided when the motor current command $I_0$ or the actual motor current I indicates an abnormal value and/or when the steering aid operation for the steering wheel 1 remains ineffective over an extended time span.

On the other hand, in the high-speed driving range where the vehicle speed V is higher than the predetermined reference vehicle speed $V_0$, the current calculating/driving means 91 sets the motor current command value $I_0$ to zero while the control apparatus 9 interrupts the clutch control signal C to thereby disconnect the electromagnetic clutch 14 from the electric motor 13. In that case, since no voltage is applied to the electric motor 13, the latter remains inactive. Further, occurrence of the system fault during the high-speed operation will involve no obstacle to the manipulation of the steering wheel. When the vehicle speed V becomes lower than the predetermined reference vehicle speed $V_0$, the clutch control signal C is again changed over to the ON-level, as a result of which the electromagnetic clutch 14 is operatively coupled to the electric motor 13 for thereby effectuate the control of the actual motor current I in dependence on the vehicle speed V and the steering torque T, as mentioned previously.

In contrast, when abnormality occurs in the control apparatus 9, an erroneous motor current command value $I_0$ may be generated to drive the electric motor 13 unwantedly, whereby the steering wheel 1 is forcibly rotated. Further, occurrence of a mechanical fault in the electric motor 13 would render it difficult for the driver to manipulate the steering wheel 1, incurring a serious situation that the steering can no more be facilitated. Although these inconveniences can certainly be tolerated in the low-speed operation range, they should never take place in the high-speed operation, because, if other wise, the safety for the steering operation is remarkably lowered.

Under the circumstances, by adopting such an arrangement that when the vehicle speed V becomes higher than the predetermined reference vehicle speed $V_0$, the clutch control signal C is changed over to the OFF-level (zero), the safety feature is ensured for the steering operation.

With the conventional motor-driven power steering control system of the structure described above, the electromagnetic clutch 14 is electrically energized in the lower-speed operation so long as no system fault takes place, while in the high-speed operation, the electromagnetic clutch 14 is disconnected from the electric motor 13 regardless of whether the system fault occurs or not. Thus, every time the vehicle speed V exceeds the predetermined reference vehicle speed $V_0$, the electromagnetic clutch 14 is disconnected from the motor 13, which is accompanied with generation of remarkably large noise, which is of course undesirable from the standpoint of comfortableness in driving the car. Besides, frequent on/off operation of the electromagnetic clutch 14 promotes degradation of durability and shortens the use life. Additionally, the on/off operation of the electromagnetic clutch 14 may be transmitted as shock to the driver who is steering by gripping the steering wheel 1.

SUMMARY OF THE INVENTION

In the light of the state of the art described above, it is an object of the present invention to provide a control apparatus for a motor-driven power steering system which apparatus is capable of preventing or mitigating the generation of noise due to operation of the electromagnetic clutch, degradation in the durability thereof and the shock given to the driver by decreasing the clutch current only upon occurrence of abnormality in a high-speed range without disconnecting the electromagnetic clutch but setting it to a so-called semi-coupling state.

In view of the above and other objects which will become apparent as description proceeds, the present invention is directed to a motor-driven power steering system for a motor vehicle which includes a vehicle speed detecting means for detecting a speed of the motor vehicle, a steering torque detecting means for detecting a steering torque applied to a steering mechanism of the motor vehicle, and an electric motor operatively coupled to the steering mechanism through the medium of a coupling effort control means, wherein an assist torque is applied to the steering mechanism by driving the electric motor in dependence on the vehicle speed and the steering torque.

In the motor-driven power steering system mentioned above, there is provided according to a first aspect of the invention a control apparatus includes an abnormal torque decision reference value arithmetic means for determining an abnormal torque decision reference value which depends on the vehicle speed detected by the vehicle speed detecting means, a load torque arithmetic means for arithmetically determining a load torque on the basis of at least a steering torque detected by the steering torque detecting means, a torque comparison means for comparing the load torque with the abnormal torque decision reference value, and a motor fault monitor/control means for stopping operation of the electric motor when the load torque exceeds the abnormal torque decision reference value while decreasing the coupling effort of the coupling effort control means.

By virtue of the arrangement that operation of the electric motor is stopped with the coupling effort of the coupling effort control means being decreased when the load torque determined on the basis of the steering torque exceeds the abnormal torque decision reference value, as described above, safety can be ensured for the steering operation even when a fault of mechanical nature takes place in the motor. Besides, because the coupling effort control means is not turned on/off in dependence on the vehicle speed, generation of noise due to operation of the coupling effort control means as well as degradation in the durability and generation of shock transmitted to the steering wheel and hence to the driver can be avoided.

According to a second aspect of the invention, there is provided an apparatus for controlling the motor-driven power steering system mentioned above, which apparatus includes an abnormal torque decision reference value arithmetic means for determining an abnormal torque decision reference value which corresponds to the vehicle speed detected by the vehicle speed detecting means, a load torque arithmetic means for arithmetically determining a load torque on the basis of a steering torque detected by the steering torque detecting means and a calculated value of the assist torque applied by the electric motor, a torque comparison means for comparing the load torque with the abnormal torque decision reference value, and a motor fault monitor/control means for stopping operation of the electric motor when the load torque exceeds the abnormal torque decision reference value decreasing the coupling effort of the coupling effort control means.

Owing to the above-mentioned arrangement that operation of the electric motor is stopped with the coupling effort of the coupling effort control means being decreased when the load torque determined on the basis of the steering torque and the calculated value of the assist torque applied by the electric motor exceeds the abnormal torque decision reference value, as described above, safety can more positively be ensured for the steering operation even when abnormality takes place in the motor. Besides, because the coupling effort control means is not turned on/off in dependence on the vehicle speed, there can be obviated the generation of noise brought about by operation of the coupling effort control means as well as degradation in the durability and generation of shock transmitted to the steering wheel.

Further, according to a third aspect of the invention, there is provided a control apparatus which includes an abnormal torque decision reference value arithmetic means for determining an abnormal torque decision reference value and a decision reference time which depends on the vehicle speed detected by the vehicle speed detecting means, a load torque arithmetic means for arithmetically determining a load torque on the basis of at least a steering torque detected by the steering torque detecting means, a torque comparison means for comparing the load torque with the abnormal torque decision reference means, and a motor fault monitor/control means for stopping operation of the electric motor when the load torque exceeds the abnormal torque decision reference value and when duration of the load toque is longer than the reference time, while decreasing the coupling effort of the coupling effort control means.

Because of the arrangement that operation of the electric motor is stopped with the coupling effort of the coupling effort control means being decreased when the load torque determined on the basis of the steering torque exceeds the abnormal torque decision reference value and when the duration of the load torque becomes longer than the reference time as described above, safety can be ensured for the steering operation even when a mechanical fault occurs in the driving motor. Besides, because the coupling effort control means is not turned on/off in dependence on the vehicle speed, the generation of noise in accompanying the operation of the coupling effort control means as well as degradation in the durability and the generation of shock can be avoided more effectively.

Besides, according to a fourth aspect of the invention, there is provided a control apparatus for the motor-driven power steering system mention hereinbefore which includes an abnormal torque decision reference value arithmetic means for determining an abnormal torque decision reference value and a reference time which depend on the vehicle speed detected by the vehicle speed detecting means, a load torque arithmetic means for arithmetically determining a load torque on the basis of a steering torque detected by the steering torque detecting means and a calculated value of the assist torque applied by the electric motor, a torque comparison means for comparing the load torque with the abnormal torque decision reference value, and a motor fault monitor/control means for stopping operation of the electric motor when the load torque exceeds the abnormal torque decision reference value and when duration of the load torque is longer than the reference time, while decreasing the coupling effort of the coupling effort control means.

With the above arrangement that operation of the electric motor is stopped with the coupling effort of the coupling effort control means being decreased when the load torque determined on the basis of the steering torque and the calculated value of the assist torque applied by the electric motor exceeds the abnormal torque decision reference value and when the duration of the load torque is longer than the decision reference time as described above, safety can be ensured for the steering operation even when abnormality even of mechanical nature takes place in the driving motor. Besides, because the coupling effort control means is not turned on/off in dependence on the vehicle speed, the generation of noise in accompanying the operation of the coupling effort control means, degradation in the durability as well as the generation of shock can be avoided more positively.

Furthermore, according to a fifth aspect of the invention, there is provided a control apparatus for the motor-driven power steering system which includes an abnormal torque decision reference value arithmetic means for determining an abnormal torque decision reference value in dependence on the vehicle speed detected by the vehicle speed detecting means, a load torque arithmetic means for arithmetically determining a load torque on the basis of at least a steering torque detected by the steering torque detecting means, a torque comparison means for comparing the load torque with the abnormal torque decision reference value, and a motor fault monitor/control means for stopping operation of the electric motor when the load torque exceeds the abnormal torque decision reference value while controlling the coupling effort of the coupling effort control means so that the steering torque value detected by the steering torque detecting means does not exceed a predetermined value at which a steering wheel of the motor vehicle can be manipulated by a driver.

By virtue of the arrangement that when the load torque derived from the steering torque exceeds the abnormal torque decision reference value, driving of the electric motor is stopped and at the same time the coupling effort of the electromagnetic clutch is so controlled that the steering torque does not exceed a preset value which permits the steering without appreciable difficulty, the coupling effort of the coupling effort control means can be prevented from being lowered in excess. In other words, the coupling effort control means operates substantially in a semi-clutch state, so to say. Thus, generation of noise due to operation of the coupling effort control means, degradation in durability and transmission of shock to the driver can be suppressed to a possible minimum. Besides, security can be ensured for the steering operation even when a mechanical fault occurs in the electric motor and other components of the power steering system.

Additionally, according to a sixth aspect of the invention, there is provided a control apparatus for the motor-driven power steering system which includes an abnormal torque decision reference value arithmetic means for determining an abnormal torque decision reference value in dependence on the vehicle speed detected by the vehicle speed detecting means, a load torque arithmetic means for arithmetically determining a load torque on the basis of a steering torque detected by the steering torque detecting means and a calculated value of the assist torque applied by the electric motor, a torque comparison means for comparing the load torque with the abnormal torque decision reference value and a motor fault monitor/control means for stopping operation of the electric motor when the load torque exceeds the abnormal torque decision reference value while controlling the coupling effort of the coupling effort control means so that the steering torque value detected by the steering torque detecting means does not exceed a predetermined value at which a steering wheel of the motor vehicle can be manipulated by a driver.

With the above arrangement that when the load torque derived from the steering torque and the calculated value of the assist torque applied by the electric motor exceed the abnormal torque decision reference value, driving of the electric motor is stopped and at the same time the coupling effort of the electromagnetic clutch is so controlled that the steering torque does not exceed a preset value which permits the steering without appreciable difficulty, the coupling effort of the coupling effort control means can be prevented from being excessively lowered. In other words, the coupling effort control means operates substantially in a semi-clutch state, so to say. Thus, generation of noise due to operation of the coupling effort control means, degradation in durability and transmission of shock to the driver can be suppressed to a possible minimum. Besides, security can be ensured for the steering operation even when a mechanical fault occurs in the electric motor and other components of the power steering system.

Additionally, according to a seventh aspect of the invention, there is provided a control apparatus for the motor-driven power steering system which includes an abnormal torque decision reference value arithmetic means for determining an abnormal torque decision reference value and a reference time in dependence on the vehicle speed detected by the vehicle speed detecting means, a load torque arithmetic means for arithmetically determining a load torque on the basis of at least a steering torque detected by the steering torque detecting means, a torque comparison means for comparing the load torque with the abnormal torque decision reference means, and a motor fault monitor/control means for stopping operation of the electric motor when the load torque exceeds the abnormal torque decision reference value and when duration of the load toque is longer than the reference time while controlling the coupling effort of the coupling effort control means so that the steering torque value detected by the steering torque detecting means does not exceed a predetermined value at which a steering wheel of the motor vehicle can be manipulated by a driver.

With the arrangement that when the load torque derived from the steering torque exceeds the abnormal torque decision reference value and when the duration of the load torque becomes longer than the decision reference time, driving of the electric motor is stopped and at the same time the coupling effort of the coupling effort control means is so controlled that the steering torque does not exceed a preset value which permits the steering without appreciable difficulty, the coupling effort of the coupling effort control means is prevented from being excessively lowered. In other words, the coupling effort control means operates substantially in a semi-clutch state, so to say. Thus, generation of noise due to operation of the coupling effort control means, degradation in durability and generation of shock wheel can be suppressed to a possible minimum. Besides, security can be ensured for the steering operation even when a mechanical fault occurs in the electric motor and other components of the power steering system.

In addition, according to an eighth aspect of the invention, there is provided a control apparatus for the motor-driven power steering system, which includes an abnormal torque decision reference value arithmetic means for determining an abnormal torque decision reference value in dependence on the vehicle speed detected by the vehicle speed detecting means, a load torque arithmetic means for arithmetically determining a load torque on the basis of a steering torque detected by the steering torque detecting means and a calculated value of the assist torque applied by the electric motor, a torque comparison means for comparing the load torque with the abnormal torque decision reference value, and a motor fault monitor/control means for stopping operation of the electric motor when the load torque exceeds the abnormal torque decision reference value and when duration of the load torque is longer than the decision reference time while controlling the coupling effort of the coupling effort control means so that the steering torque value detected by the steering torque detecting means does not exceed a predetermined value at which a steering wheel of the motor vehicle can be manipulated by a driver.

With the arrangement that when the load torque derived from the steering torque and the calculated value of the assist torque applied by the electric motor exceeds the abnormal torque decision reference value and when the duration of the load torque becomes longer than the reference time, driving of the electric motor is stopped and at the same time the coupling effort of the electromagnetic clutch is so controlled that the steering torque does not exceed a preset value which permits the steering without appreciable difficulty, the coupling effort of the coupling effort control means can be prevented from being lowered in excess. In other words, the coupling effort control means operates substantially in a semi-clutch state, so to say. Thus, generation of noise, degradation in durability and transmission of shock to the driver can be suppressed to a possible minimum. Besides, security can be ensured for the steering operation (i.e., manipulation of the steering wheel) even when a mechanical fault occurs in the electric motor and other components of the power steering system.

In a preferred mode for carrying out the invention, the control apparatus may further include a motor rotation decision means for deciding whether the electric motor is rotating or not, wherein for a predetermined time from the time point when the motor rotation decision means decides that the electric motor is rotating, operation of the motor fault monitor/control means is inhibited.

With the above arrangement, when it is decided that the electric motor is rotating, operation of the motor fault monitor/control means is inhibited. Thus, safety can be ensured for the steering operation even when a fault of mechanical nature takes place in the motor. Besides, because the coupling effort control means is not turned on/off in dependence on the vehicle speed, generation of noise due to operation of the coupling effort control means, degradation in the durability and generation of shock can be avoided more positively.

In another preferred mode for carrying out the invention, the control apparatus may further include a motor voltage detecting means for detecting a voltage applied to the electric motor, a motor current detecting means for detecting a motor current flowing through the electric motor, and a motor rotation decision means for estimating rotation number (rpm) of the electric motor on the basis of the motor voltage and the motor current to thereby decide whether or not the electric motor rotates, wherein operation of the motor fault monitor/control means is inhibited when the motor rotation decision means decides that the electric motor is rotating.

The motor rotation decision means mentioned above estimates the rotation number (rpm) of the electric motor on the basis of the motor voltage and the motor current to thereby decide whether or not the electric motor rotates. When it is decided that the motor is rotating, operation of the motor fault monitor/control means is inhibited. Thus, safety can be ensured for the steering operation even when a fault takes place in the motor. Besides, because the coupling effort control means is not turned on/off in dependence on the vehicle speed, generation of noise due to operation of the coupling effort control means, degradation in the durability and the generation of shock can be avoided more positively.

In yet another preferred mode for carrying out the invention, the control apparatus may further include a motor regeneration voltage detecting means for detecting a voltage generated by the electric motor, and a motor rotation decision means for deciding on the basis of the voltage whether or not the electric motor is rotating, wherein operation of the motor fault monitor/control means is inhibited when the motor rotation decision means decides that the electric motor is rotating.

With the arrangement in which the motor rotation decision means estimates rotation number (rpm) of the electric motor on the basis of the motor generated by the motor (regeneration voltage) voltage and the motor current to thereby decide whether or not the electric motor rotates, wherein operation of the motor fault monitor/control means is inhibited when the motor rotation decision means decides that the electric motor is rotating, safety can be ensured for the steering operation even when a fault of mechanical nature occurs in the motor. Besides, because the coupling effort control means is not turned on/off in dependence on the vehicle speed, generation of noise due to operation of the coupling effort control means, degradation in the durability and the generation of shock can be avoided more positively.

In still further preferred mode for carrying out the invention, the control apparatus may further include a motor rotation decision means for deciding whether the electric motor is rotating or not, wherein for a predetermined time from the time point when the motor rotation decision means decided that the electric motor was rotating, operation of the motor fault monitor/control means is inhibited.

With the above arrangement, safety can equally be ensured for the steering operation even when abnormality of mechanical nature occurs in the motor. Besides, because the coupling effort control means is not turned on/off in dependence on the vehicle speed, generation of noise due to operation of the coupling effort control means, degradation in the durability and generation of shock transmitted to the steering wheel can be avoided more positively.

In a yet further preferred mode for carrying out the invention, the coupling effort control means may be constituted by a disk type electromagnetic clutch having a clutch gap substantially equal to zero.

By virtue of this feature, safety can be ensured for the steering operation. Besides, because the disk type electromagnetic clutch is not turned on/off in dependence on the vehicle speed, generation of noise due to operation of the disk clutch, degradation in the durability and generation of shock transmitted to the steering wheel and hence to the driver can be avoided more positively.

The above other objects, features and attendant advantages of the present invention will more clearly be understood by reading the following description of the preferred embodiments thereof taken, only by way of example, in conjunction with the drawings.

DESCRIPTION OF THE PREFERRED EMBODIMENTS

In the following, the present invention will be described in detail in conjunction with the preferred or exemplary embodiments thereof by reference to the drawings.

Figure 1:
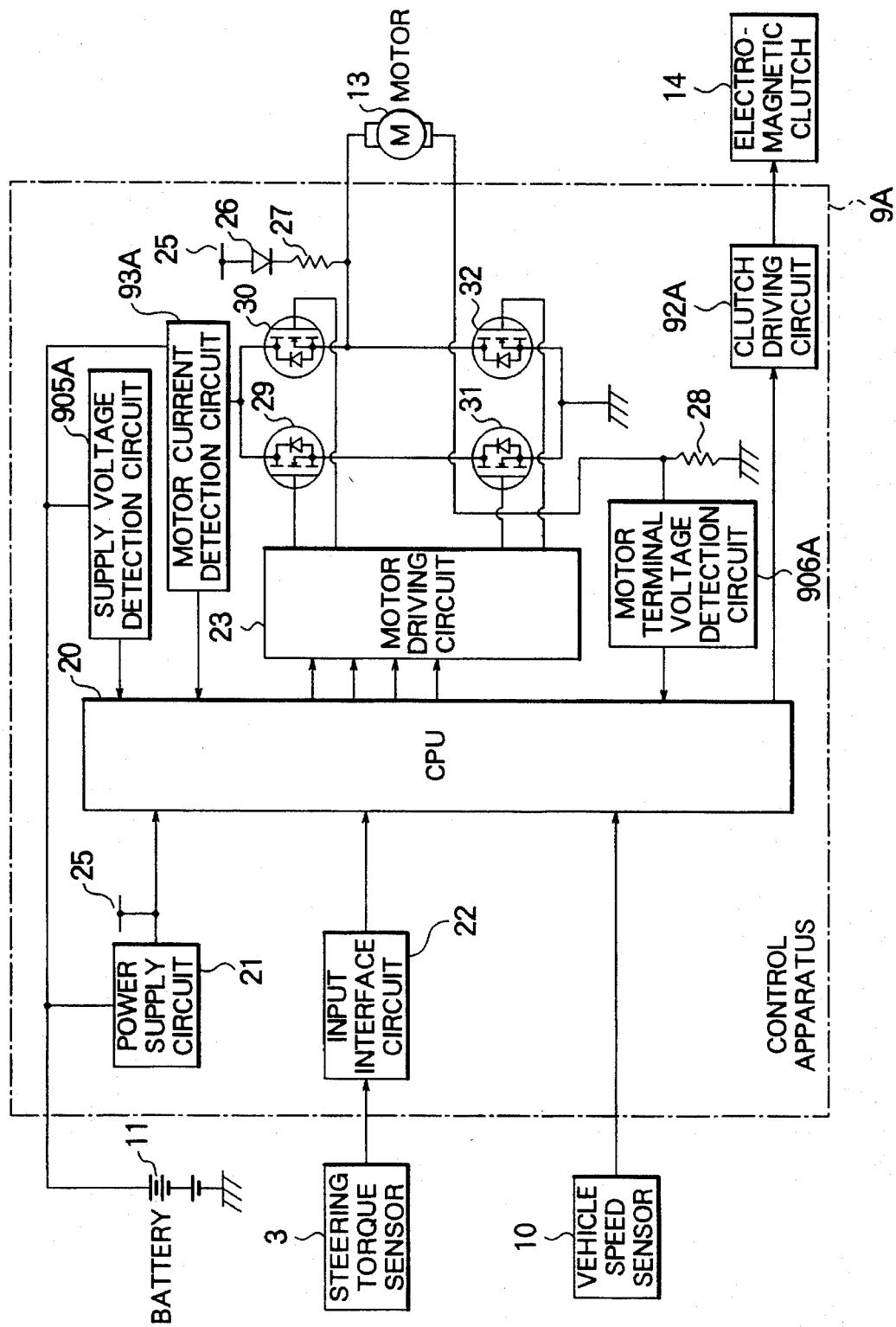
FIG. 1 is a block diagram showing a general arrangement of a control apparatus for a motor-driven power steering system according to an embodiment of the present invention.
Figure 7:
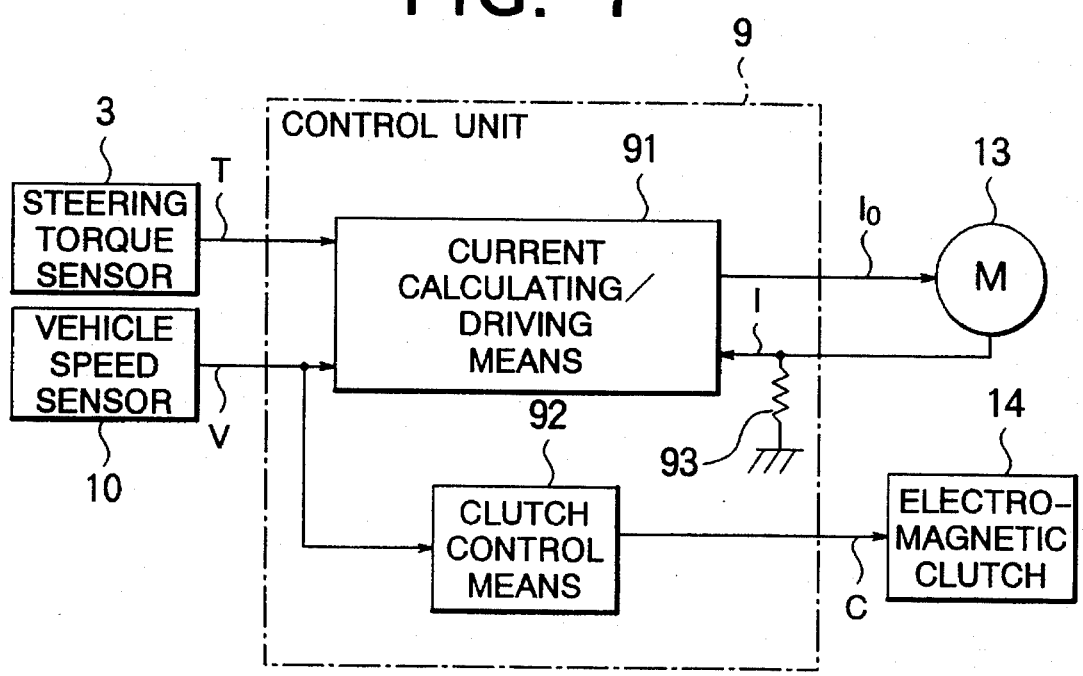
FIG. 7 is a functional block diagram showing a configuration of the control apparatus incorporated in the above system.
Figure 8:
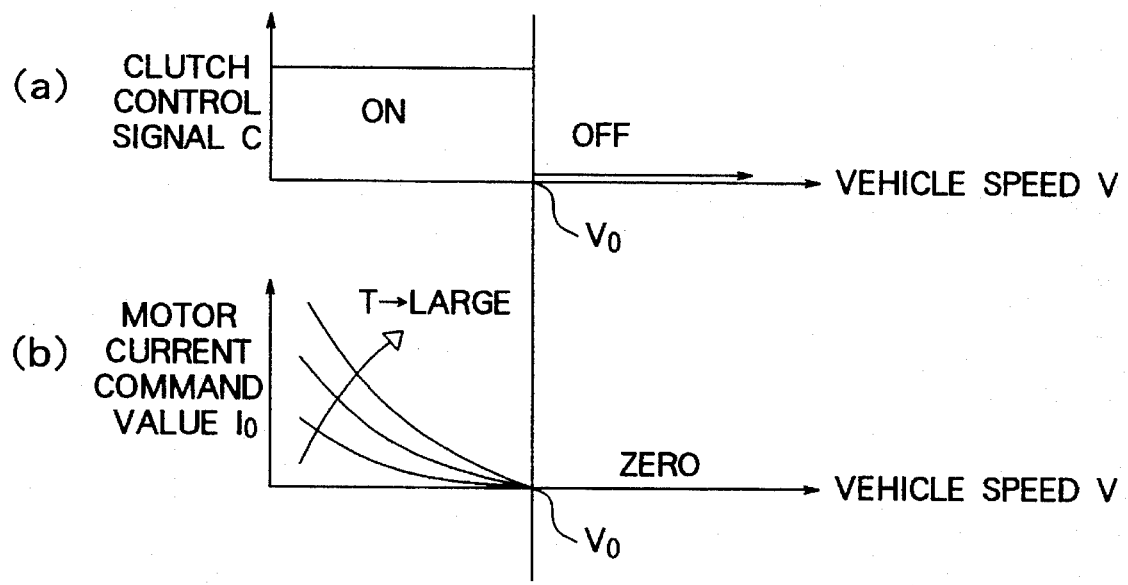
FIG. 8 is a view for graphically illustrating changes in the clutch control signal and the motor current command value $I_0$.

FIG. 1 is a block diagram showing a general arrangement of a control apparatus for a motor-driven power steering system according to an exemplary embodiment of the invention. In the figure, like parts or components as those described hereinbefore by reference to FIG. 7 are denoted by like reference symbols, and repeated description thereof is omitted.

The control apparatus according to the instant embodiment of the invention includes a control unit 9A which incorporates a central processing unit (hereinafter referred to as the CPU in abbreviation) 20 and a power source circuit 21 connected to a battery 11 for supplying electric power to various circuits such as the CPU 20 and others incorporated in the control apparatus 9A.

A steering torque T detected by the steering torque sensor 3 is supplied to the CPU 20 via an input interface circuit 22. Similarly, the vehicle speed V detected by the vehicle speed sensor 10 is supplied to the CPU 20 as another input thereto. The CPU 20 performs predetermined processings on these input signals in the manner which will be described later on, to thereby generate a motor driving signal which is supplied to the motor driving circuit 23.

The motor driving circuit 23 responds to the motor driving signal supplied from the CPU 20 to control the electric motor 13 via a bridge circuit which may be constituted by, for example, four field effect transistors (FETs in abbreviation) 29 to 32 connected in an H-like bridge circuit configuration.

The electromagnetic clutch 14 is adapted to be driven by a clutch driving circuit 92A which in turn is controlled by the CPU 20.

A motor current detection circuit 93A is provided for detecting a current flowing through the motor 13, wherein the output signal of this circuit 93A is supplied to the CPU 20. The motor current detection circuit 93A may be constituted by a resistor.

For applying a bias voltage across the motor 13, one of the motor terminals is connected to a power supply terminal 25 via a serial circuit of a resistor 27 and a cathode-anode path of a diode 26. The power supply terminal 25 is supplied with a DC voltage from the power supply circuit 21.

The other terminal of the motor 13 is connected to the ground potential via a resistor 28, wherein a junction between that motor terminal and the resistor 28 is connected to a motor terminal voltage detection circuit 906A, the output signal of which is also supplied to the CPU 20.

Figure 2:
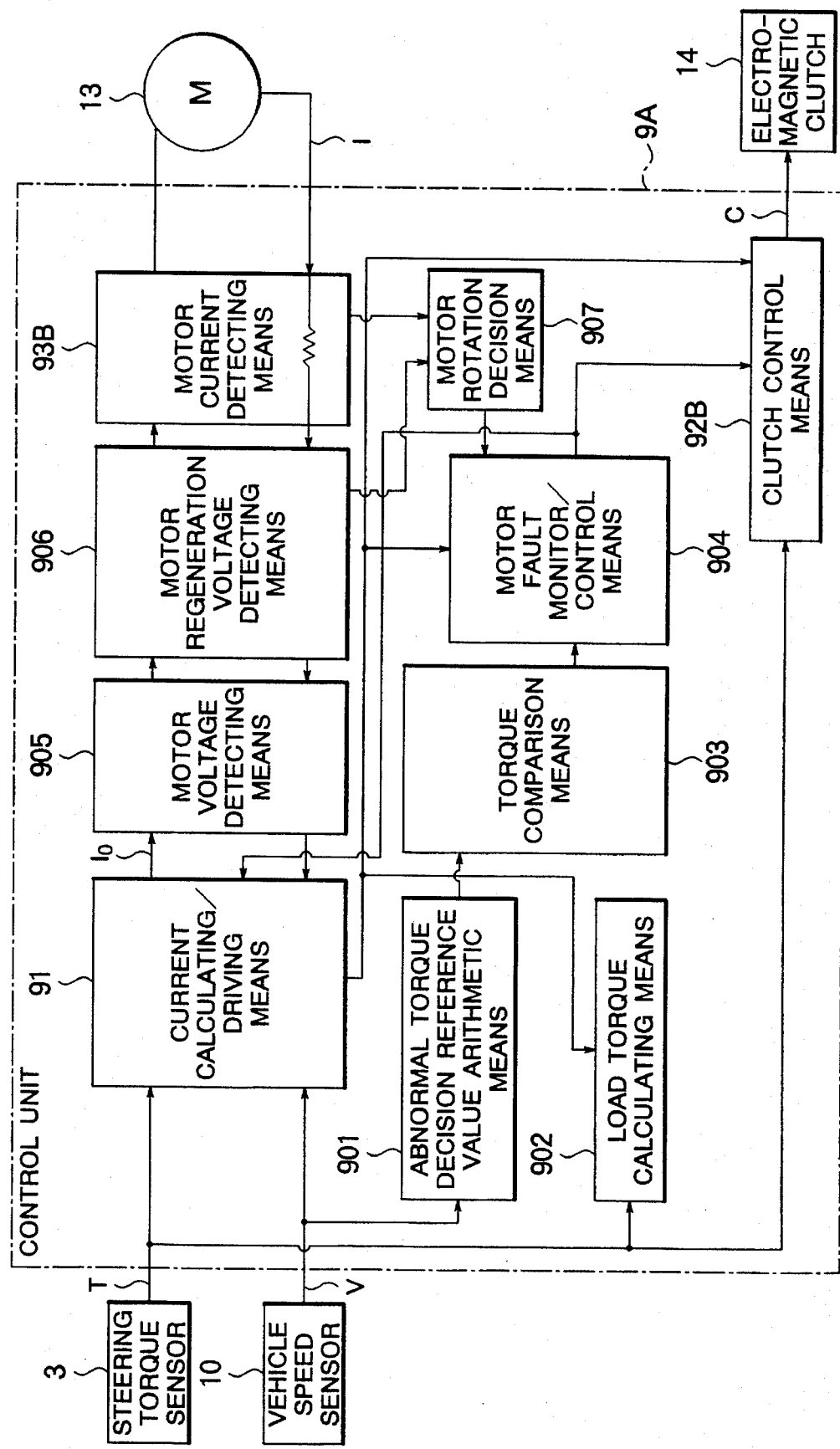
FIG. 2 is a functional block diagram for illustrating various functions performed by the control apparatus 9A according to an embodiment of the invention.

FIG. 2 is a functional block diagram for illustrating various functions performed by the control apparatus 9A according to the instant embodiment of the invention. More specifically, there are implemented in the control apparatus 9A a current calculating/driving means 91 for arithmetically determining a motor current command value $I_0$ on the basis of the steering torque T supplied from the steering torque sensor 3 and the vehicle speed V supplied from the vehicle speed sensor 10 for driving the electric motor 13, a clutch control means 92B which corresponds to the clutch driving circuit 92A shown in FIG. 1 and which serves for controlling continuously the clutch control signal C for the electromagnetic clutch 14 from the ON-level to the OFF-level in a continuous manner, and a motor current detecting means 93B which corresponds to the motor current detection circuit 93A shown in FIG. 1 and which serves to detect the actual motor current I of the motor 13 to thereby supply the signal indicating the actual motor current I to the current calculating/driving means 91.

The current calculating/driving means 91 responds to a feedback signal indicating the actual motor current I detected by the motor current detecting means 93 for thereby controlling the voltage applied across the motor 13 so that the current corresponding to the motor current command value $I_0$ can flow through the motor 13. On the other hand, the clutch control means 92B is designed to interrupt the clutch control signal C when occurrence of a system fault is decided on the basis of the detection signals available from the various sensors.

An abnormal torque decision reference value arithmetic means 901 arithmetically determines or calculates an abnormal torque decision reference value $T_0$ and a reference time $t_0$ on the basis of the vehicle speed detected by the vehicle speed sensor 10.

The abnormal torque decision reference value $T_0$ and the decision reference time $t_0$ can be determined by referencing a table prepared by actually measuring the steering torques T and the durations thereof at a plurality of different vehicle speeds in the state where no assist torque is applied. The table as prepared is stored in a memory incorporated in the control apparatus 9A although not shown.

Figure 3:
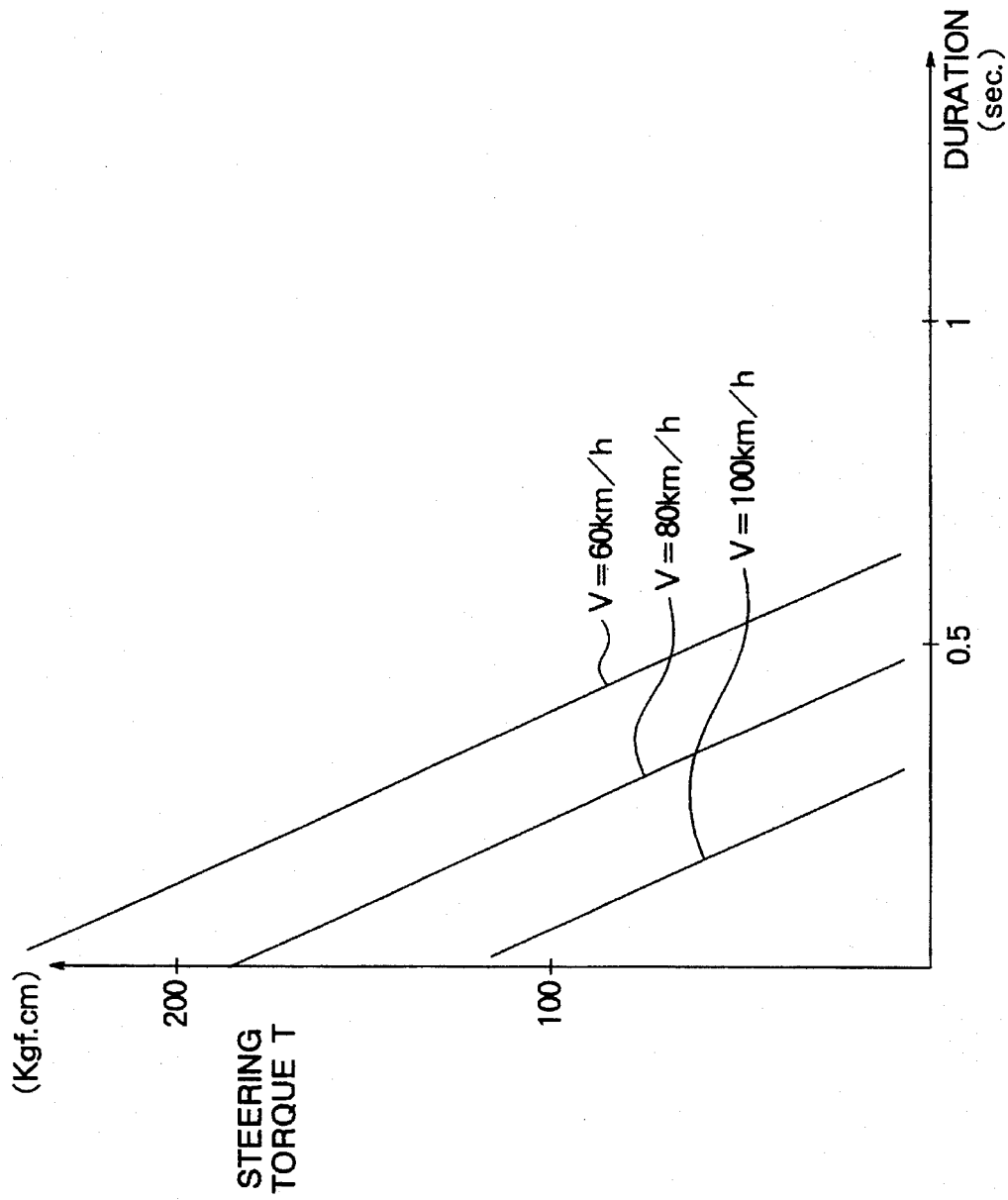
FIG. 3 is a view for graphically illustrating relations among a vehicle speed, a clutch control signal and a motor current command as stored in a memory in the form of a lookaside table.

In this conjunction, FIG. 3 shows graphically the contents of the lookaside table mentioned above. In the figure, there are illustrated, by way of example only, relations between the abnormal torque decision reference values $T_0$ and the reference times $t_0$ with the vehicle speeds of 60 km/h, 80 km/h and 100 km/h, respectively, being used as a parameter. By referencing these relations stored in the memory in the form of a lookaside table, it is possible to make decision as to whether or not abnormality takes place in the motor 13 or other components of the steering mechanism.

As can be seen from FIG. 3, the abnormal torque and the duration thereof as decided become smaller as the vehicle speed increases.

At this juncture, it should be mentioned that although both the abnormal torque decision reference value $T_0$ and the reference time $t_0$ are used for deciding occurrence of abnormality in the motor-driven power steering system in the case of the instant embodiment of the invention, as described hereinafter, the abnormality decision may equally be made on the basis of the abnormal torque decision reference value $T_0$ alone.

A load torque calculating means 902 is also provided which is designed to determine a load torque $T_L$ by adding the steering torque T detected by the steering torque sensor 3 with an assist torque applied by the motor 13 which may arithmetically be determined on the basis of the actual motor current I or the motor current command value $I_0$.

Parenthetically, the steering torque T may be used intact as the load torque $T_L$.

Comparison of the load torque $T_L$ with the abnormal torque decision reference value $T_0$ mentioned above and comparison of duration $t_L$ of the load torque $T_L$ with the reference time $t_0$, if desired, are performed by a torque comparison means 903. When comparison mentioned above results in that the load torque $T_L$ exceeds the abnormal torque decision reference value $T_0$ and that the duration $t_L$ of the load torque $T_L$ is longer than the decision reference time $t_0$, a motor fault monitor/control (or processing) means 904 decides that abnormality such as locked state takes place in the motor 13 to thereby issue a command to the current calculating/driving means 91 for stopping operation of the motor 13 and at the same time a command to the clutch control means 92B for decreasing the coupling effort of the electromagnetic clutch 14.

The electromagnetic clutch 14 may preferably be realized in the form of an electromagnetic dry-type disk clutch having a clutch gap substantially of zero so that the electromagnetic clutch 14 can remain in a semi-coupling state even when the clutch control means 92B is deactivated, in order to suppress or mitigate the noise generation due to actuation of the electromagnetic clutch 14 as well as degradation of durability thereof and the shock which the driver will experience, as described previously in conjunction with the prior art motor-driven power steering system.

At this juncture, it should however be mentioned that when it is decided that the load torque $T_L$ exceeds the abnormal torque decision reference value $T_0$, occurrence of abnormality is decided to thereby command the current calculating/driving means 91 to stop operation of the motor 13 while controlling the coupling effort of the electromagnetic clutch 14 substantially in the semi-clutch state even when the clutch control means 92B is deactivated (turned off) so that the steering torque T detected by the steering torque sensor 3 does not exceed a predetermined value (e.g. 50 kgf.cm) which permits manipulation of the steering wheel. With this arrangement, the coupling effort of the electromagnetic clutch 14 is prevented from lowering in excess. Thus, the noise generation due to operation of the electromagnetic clutch as well as degradation in durability thereof and occurrence of the steering shock can be prevented in a satisfactory manner.

In this case, abnormality decision of the motor 13 may be made on the basis of not only the abnormal torque decision reference value $T_0$ but also the reference time $t_0$, wherein when the load torque $T_L$ exceeds the abnormal torque decision reference value $T_0$ and when the duration $T_L$ thereof exceeds the reference time $t_0$, decision is made that abnormality occurs, to thereby command the current calculating/driving means 91 to stop operation of the motor 13 while controlling simultaneously the coupling effort of the electromagnetic clutch 14 by controlling continuously the clutch control means 92B from the ON-state to the OFF-state in dependence on the steering torque T so that the steering torque T detected by the steering torque sensor 3 does not exceed a predetermined value (e.g. 50 kgf.cm) which provides substantially no obstacle to the manual operation of the steering wheel. By virtue of this arrangement, the coupling effort of the electromagnetic clutch 14 need not be decreased excessively. Besides, the problems mentioned above can be coped with more positively.

A motor voltage detecting means 905 is provided for detecting a motor drive voltage. To this end, the motor voltage detecting means 905 may be so arranged as to detect a voltage applied across the motor 13 on the basis of the source voltage detected by the power supply voltage detection circuit 905A (refer to FIG. 1) and a pulse duration (or duty ratio) of the PWM (Pulse Width Modulated) signal outputted from the CPU 20 for driving the H-bridge circuit mentioned previously while taking into account the voltage drop occurring in the circuitry intervening between the motor 13 and the power source therefor.

On the other hand, the motor current detection circuit 93A serves for detecting the actual motor current I flowing through the motor 13. The motor current detection circuit 93A may be constituted by a shunt resistor inserted in the power supply line for the motor 13. On the basis of a voltage appearing across this resistor, the motor current I can be determined.

A motor rotation decision means 907 serves for deciding whether or not the motor 13 is rotating by estimating a rotation number $N_M$ of the motor 13 on the basis of the voltage applied to the motor 13 and the actual motor current I. More specifically, a regeneration voltage is estimated from the actual motor current I and a motor current in the stationary state of the motor 13 which in turn can be determined from the voltage applied to the motor 13 and the armature resistance thereof. On the basis of this regeneration voltage, it is decided whether the motor 13 is rotating or not. This decision is primarily effectuated in the state the motor 13 is being driven.

The motor regeneration voltage detecting means 906 serves to detect the voltage generated by the motor 13 when it is not driven. The motor regeneration voltage detecting means 906 corresponds to the motor terminal voltage detection circuit 906A shown in FIG. 1. More specifically, a bias circuit which is constituted by the diode 26 and the resistors 27 and 28, as shown in FIG. 1, is provided, wherein the regeneration voltage of the motor 13 is detected as the terminal voltage of the resistor 28 and supplied to the motor regeneration voltage detecting means 906 for allowing the latter to make decision as to whether or not the motor 13 is rotating.

Further, a motor rotation decision means 907 is provided for inhibiting the processing operation of the motor fault monitor/control means 904 when it is decided that the motor 13 is rotating. In this conjunction, it should be mentioned that the operation for inhibiting the motor fault processing may be validated only for a predetermined time from the time point when decision was made that the motor 13 is rotating. This can readily be realized by using a timer counter (not shown).

It should however be mentioned that the motor rotation decision means 907 may get rid of the function for inhibiting the operation of the motor fault monitor/control means 904.

Parenthetically, the clutch control means 92B and the electromagnetic clutch 14 cooperate to constitute the coupling effort control means of the control apparatus according to the invention. Further, the abnormal torque decision reference value arithmetic means 901, the load torque calculating means 902, the motor fault monitor/control means 904 and the motor voltage detecting means 905 may be implemented softwarewise so as to be executed by the CPU 20 shown in FIG. 1.

Figure 4:
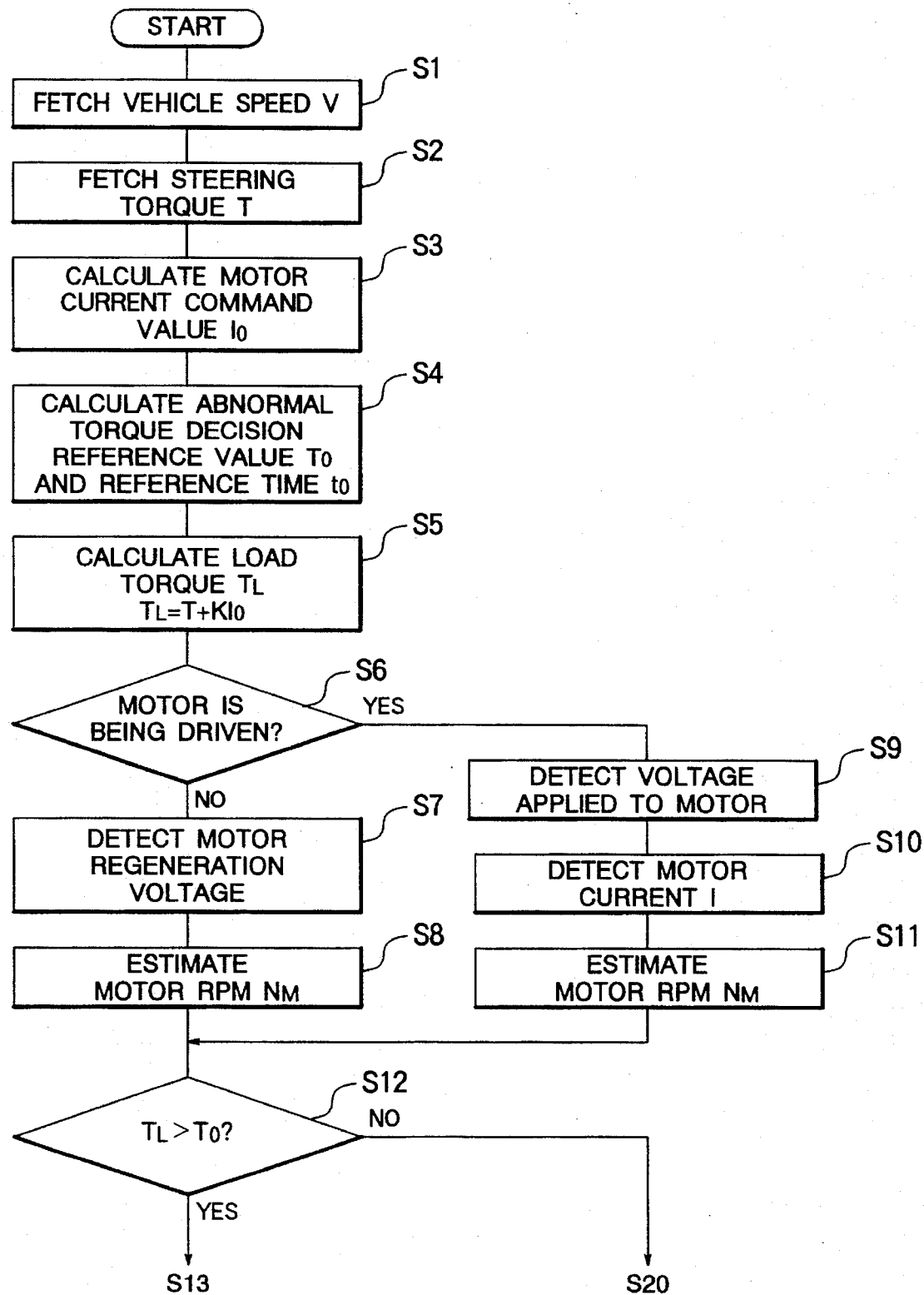
FIG. 4 is a flow chart for illustrating operation of the control apparatus according to the invention.
Figure 5:
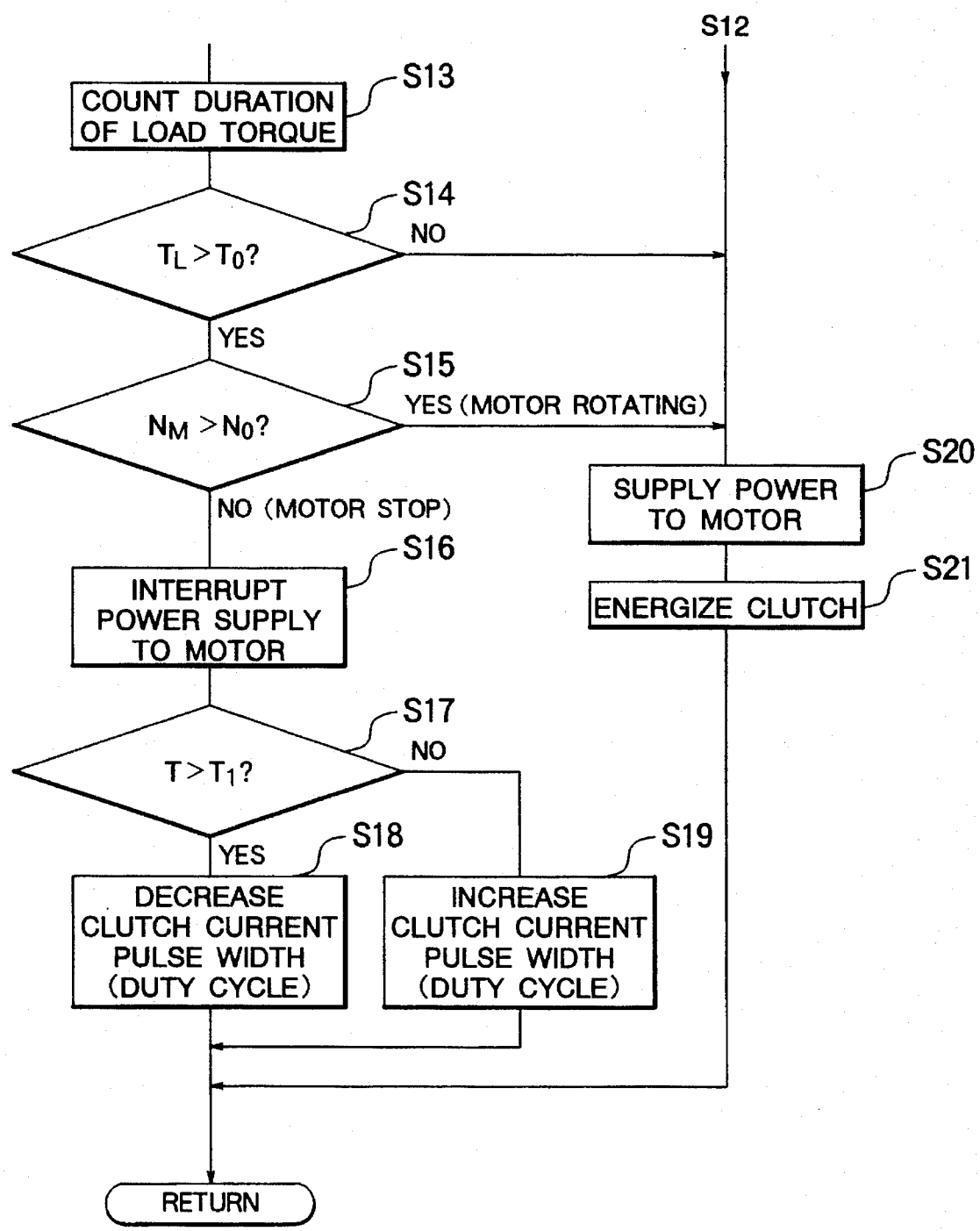
FIG. 5 is a flow chart to which the flow chart of FIG. 4 is to be continued.
Figure 6:
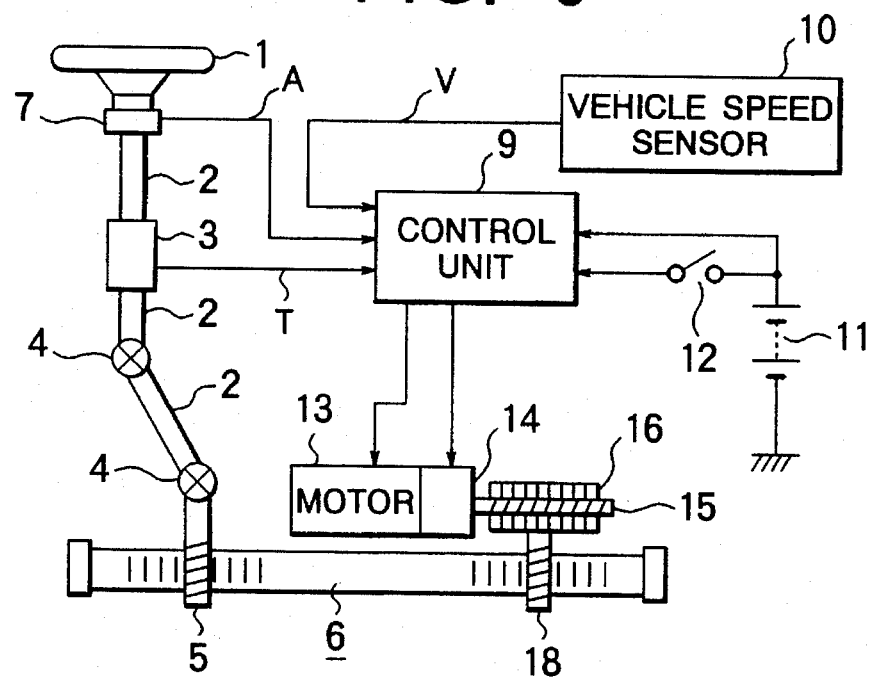
FIG. 6 is a schematic diagram showing a general arrangement of a conventional motor-driven power steering control system.

Next, referring to FIGS. 4 and 5, description will turn to operation of the control apparatus for the motor-driven power steering system according to the instant embodiment of the invention.

In a step S1, the vehicle speed V is fetched from the output of the vehicle speed sensor 10, while in a step S2, the steering torque T is fetched from the output of the steering torque sensor 3.

Subsequently, in a step S3, the motor current command value $I_0$ is calculated by the current calculating/driving means 91 on the basis of the vehicle speed V and the steering torque T.

In a step S4, the abnormal torque decision reference value $T_0$ and the reference time $t_0$ in dependence on the vehicle speed V as detected are determined by the abnormal torque decision reference value arithmetic means 901 by referencing the lookaside table mentioned hereinbefore (see FIG. 3).

In a step S5, the load torque $T_L$ is determined by the load torque calculating means 902 by adding the steering torque T detected by the steering torque sensor 3 with a calculated value $KI_0$ (or KI) of the assist torque of the motor 13 determined on the basis of the motor current I (or $I_0$). In the above expression, K represents a constant.

In a step S6, it is decided by the current calculating/driving means 91 whether the motor 13 is being driven or not. When the motor 13 is being driven (i.e., when the decision step S6 results in affirmation or "YES"), the processing proceeds to a step S9. If otherwise (i.e., when the answer of the decision step S6 is negative "NO"), the processing proceeds to a step S7.

In the step S9, the voltage applied to the motor 13 is detected by the motor voltage detecting means 905.

Then, in a step S10, the actual motor current I is detected by the motor current detection circuit 93A.

In succession, in a step S11, the rotation number $N_M$ of the motor 13 is estimated by the motor rotation decision means 907 on the basis of the voltage applied to the motor 13 and the actual motor current I. More specifically, on the basis of the actual motor current I detected in the step S10 and the motor current in the stationary state of the motor 13 which can be determined by the voltage applied to the motor 13 and the armature resistance thereof, the regeneration voltage of the motor 13 (i.e., the voltage generated by the motor 13) is estimated. The rotation number $N_M$ is then estimated on the basis of the regeneration voltage of the motor 13.

On the other hand, in the step S7, the motor regeneration voltage detecting means 906 detects the motor regeneration voltage, which is then followed by a step S8 where the rotation number $N_M$ (rpm) of the motor 13 is estimated.

Next, in a step S12, decision is made by the torque comparison means 903 whether the load torque $T_L$ is greater than the abnormal torque decision reference value $T_0$ or not. When it is decided that $T_L > T_0$, the processing proceeds to a step S12 and, if otherwise, to a step S20.

In the step S13, the duration $t_L$ of the load torque $T_L$ is measured, which is then followed by a step S14 where it is decided by the torque comparison means 903 whether the duration $t_L$ is longer than the reference time $t_0$. When $t_L > t_0$, the processing proceeds to a step S15 and, if otherwise, to the step S20.

In the step S15, the motor rotation decision means 907 compares the rotation number $N_M$ (rpm) of the motor 13 with a predetermined reference vehicle speed $N_0$. In other words, it is decided whether the rotation number $N_M$ is greater than a motor stop decision reference rotation number (rpm) $N_0$, or whether the motor 13 is rotating or not, to say in another way.

When the comparison results in that the rotation number $N_M$ is greater than $N_0$, indicating rotation of the motor 13, then the processing proceeds to the step S20, because the comparison shows no occurrence of abnormality in the motor 13. In the step $20, the motor 13 is electrically energized or driven by the motor fault monitor/control means 904 via the current calculating/driving means 91. Subsequently, in a step S21, the electromagnetic clutch 14 is electrically energized via the clutch driving circuit 92A. The processing then returns to the start step labelled "START".

By contrast, when it is decided in the step S15 that $N_M \leq N_0$, indicating that the motor 13 is not rotating, the processing proceeds to a step S16 to interrupt the power supply to the motor 13, whereupon a step S17 is executed.

In the step S17, it is decided by the clutch control means 92B whether or not the steering torque T detected by the steering torque sensor 3 exceeds a preset torque limitation trigger value $T_1$ (e.g. 50 kgf.cm).

When the steering torque T is greater than the preset torque limitation triggering value $T_1$, the duty cycle of the PWM signal for controlling the electromagnetic clutch 14 is decreased to thereby lower the clutch current, whereby the coupling effort of the electromagnetic clutch 14 is correspondingly reduced. On the other hand, unless the steering torque T is greater than the preset torque limitation triggering value $T_1$, the duty cycle mentioned above is increased to allow the clutch current and hence the coupling effort of the electromagnetic clutch 14 to increase correspondingly.

In this manner, the clutch control means 92B is controlled from the ON-state to the OFF-state continuously (not discontinuously) in dependence on the steering torque T so that the steering torque T does not exceed the preset torque limitation triggering value $T_1$, whereby the coupling effort of the electromagnetic clutch 14 can be controlled essentially in a semi-clutch state, so to say. In other words, the coupling effort of the electromagnetic clutch 14 is prevented from lowering in excess, whereby the problems of the prior art system such as generation of clutch actuation noise, degradation of durability and the shock which the driver will experience can satisfactorily be solved.

At this juncture, it should be added that the steps S14 and S15 mentioned above may be spared, if desired.

Further, when the electromagnetic clutch 14 is constituted by a dry-type electromagnetic disk clutch having a clutch gap substantially of zero, the electromagnetic clutch 14 remains in the semi-clutch state even when the clutch control means 92B is turned off, whereby the problem of the prior art system such as generation of noise, etc., can be solved satisfactorily. In this case, the clutch energization control may simply be interrupted in the step S17.

It has been assumed that the comparison of the rotation number $N_M$ with the motor stop decision reference rotation number (rpm) $N_0$ is performed in the step S15 every time the processing routine described above is executed. However, such arrangement may equally be adopted that once the rotation of the motor 13 is decided, this decision is maintained valid for a predetermined period by using a timer, whereby unwanted hunting phenomenon can be avoided.

Many modifications and variations of the present invention are possible in the light of the above techniques. It is therefore to be understood that within the scope of the appended claims, the invention may be practiced otherwise than as specifically described.

I claim:

1. In a motor-driven power steering system for a motor vehicle which includes vehicle speed detecting means for detecting a vehicle speed of said motor vehicle, steering torque detecting means for detecting a steering torque applied to a steering mechanism of said motor vehicle, and an electric motor operatively coupled to said steering mechanism through the medium of coupling effort control means, wherein an assist torque is applied to said steering mechanism by driving said electric motor in dependence on said vehicle speed, an apparatus for controlling said motor-driven power steering system, comprising:

abnormal torque decision reference value arithmetic means for determining an abnormal torque decision reference value which corresponds to the vehicle speed detected by said vehicle speed detecting means;

load torque arithmetic means for arithmetically determining a load torque on the basis of at least a steering torque detected by said steering torque detecting means;

torque comparison means for comparing said load torque with said abnormal torque decision reference value; and motor fault monitor/control means for stopping operation of said electric motor when said load torque exceeds said abnormal torque decision reference value while decreasing the coupling effort of said coupling effort control means wherein said coupling effort control means comprises an electric clutch and wherein when the coupling effort of said coupling effort control means is decreased, said electric clutch assumes a semi-coupling state.

2. A control apparatus according to claim 1, further comprising:

motor rotation decision means for deciding whether said electric motor is rotating or not;

wherein when said motor rotation decision means decides that said electric motor is rotating, operation of said motor fault monitor/control means is inhibited.

3. A control apparatus according to claim 1, further comprising:

motor voltage detecting means for detecting a voltage applied to said electric motor;

motor current detecting means for detecting a motor current flowing through said electric motor; and motor rotation decision means for estimating rotation number of said electric motor on the basis of said motor voltage and said motor current to thereby decide whether or not said electric motor rotates;

wherein operation of said motor fault monitor/control means is inhibited when said motor rotation decision means decides that said electric motor is rotating.

4. A control apparatus according to claim 1, further comprising:

motor regeneration voltage detecting means for detecting a voltage generated by said electric motor; and motor rotation decision means for deciding on the basis of said voltage whether or not said electric motor is rotating;

wherein operation of said motor fault monitor/control means is inhibited when said motor rotation decision means decides that said electric motor is rotating.

5. A control apparatus according to claim 1, further comprising:

motor rotation decision means for deciding whether said electric motor is rotating or not;

wherein for a predetermined time from the time point when said motor rotation decision means decided that said electric motor was rotating, operation of said motor fault monitor/control means is inhibited.

6. A control apparatus according to claim 1, wherein said coupling effort control means is constituted by a disk type electromagnetic clutch having a clutch gap substantially equal to zero.

7. In a motor-driven power steering system for a motor vehicle which includes vehicle speed detecting means for detecting a speed of said motor vehicle, steering torque detecting means for detecting a steering torque applied to a steering mechanism of said motor vehicle, and an electric motor operatively coupled to said steering mechanism through the medium of coupling effort control means, wherein an assist torque is applied to said steering mechanism by driving said electric motor, an apparatus for controlling said motor-driven power steering system, comprising:

abnormal torque decision reference value arithmetic means for determining an abnormal torque decision reference value in dependence on the vehicle speed detected by said vehicle speed detecting means;

assist torque determining means for determining assist torque applied by said electric motor;

load torque arithmetic means for arithmetically determining a load torque on the basis of a steering torque detected by said steering torque detecting means and on the determined assist torque;

torque comparison means for comparing said load torque with said abnormal torque decision reference value; and motor fault monitor/control means for stopping operation of said electric motor when said load torque exceeds said abnormal torque decision reference value while decreasing the coupling effort of said coupling effort control means.

8. A control apparatus for a motor-driven power steering system according to claim 7, further comprising:

motor rotation decision means for deciding whether said electric motor is rotating or not;

wherein when said motor rotation decision means decides that said electric motor is rotating, operation of said motor fault monitor/control means is inhibited.

9. A control apparatus according to claim 7, further comprising:

motor voltage detecting means for detecting a voltage applied to said electric motor;

motor current detecting means for detecting a motor current flowing through said electric motor; and motor rotation decision means for estimating rotation number of said electric motor on the basis of said motor voltage and said motor current to thereby decide whether or not said electric motor rotates;

wherein operation of said motor fault monitor/control means is inhibited when said motor rotation decision means decides that said electric motor is rotating.

10. A control apparatus according to claim 7, further comprising:

motor regeneration voltage detecting means for detecting a voltage generated by said electric motor; and motor rotation decision means for deciding on the basis of said voltage whether or not said electric motor is rotating;

wherein operation of said motor fault monitor/control means is inhibited when said motor rotation decision means decides that said electric motor is rotating.

11. A control apparatus according to claim 7, further comprising:

motor rotation decision means for deciding whether said electric motor is rotating or not;

wherein for a predetermined time from the time point when said motor rotation decision means decided that said electric motor was rotating, operation of said motor fault monitor/control means is inhibited.

12. A control apparatus according to claim 7, wherein said coupling effort control means is constituted by a disk type electromagnetic clutch having a clutch gap substantially equal to zero.

13. In a motor-driven power steering system for a motor vehicle which includes vehicle speed detecting means for detecting a speed of said motor vehicle, steering torque detecting means for detecting a steering torque applied to a steering mechanism of said motor vehicle, and an electric motor operatively coupled to said steering mechanism through the medium of coupling effort control means, wherein an assist torque is applied to said steering mechanism by driving said electric motor, an apparatus for controlling said motor-driven power steering system, comprising:

abnormal torque decision reference value arithmetic means for determining an abnormal torque decision reference value and a reference time in dependence on the vehicle speed detected by said vehicle speed detecting means;

load torque arithmetic means for arithmetically determining a load torque on the basis of at least a steering torque detected by said steering torque detecting means;

torque comparison means for comparing said load torque with said abnormal torque decision reference value; and motor fault monitor/control means for stopping operating of said electric motor when said load torque exceeds said abnormal torque decision reference value and when in duration in which said load torque exceeds said abnormal torque decision reference value is longer than said reference time, while decreasing the coupling effort of said coupling effort control means.

14. A control apparatus according to claim 13, further comprising:

motor rotation decision means for deciding whether said electric motor is rotating or not;

wherein when said motor rotation decision means decides that said electric motor is rotating, operation of said motor fault monitor/control means is inhibited.

15. A control apparatus according to claim 13, further comprising:

motor voltage detecting means for detecting a voltage applied to said electric motor;

motor current detecting means for detecting a motor current flowing through said electric motor; and motor rotation decision means for estimating rotation number of said electric motor on the basis of said motor voltage and said motor current to thereby decide whether or not said electric motor rotates;

wherein operation of said motor fault monitor/control means is inhibited when said motor rotation decision means decides that said electric motor is rotating.

16. A control apparatus according to claim 13, further comprising:

motor regeneration voltage detecting means for detecting a voltage generated by said electric motor; and motor rotation decision means for deciding on the basis of the voltage whether or not said electric motor is rotating;

wherein operation of said motor fault monitor/control means is inhibited when said motor rotation decision means decides that said electric motor is rotating.

17. A control apparatus according to claim 13, further comprising:

motor rotation decision means for deciding whether said electric motor is rotating or not;

wherein for a predetermined time from the time point when said motor rotation decision means decided that said electric motor was rotating, operation of said motor fault monitor/control means is inhibited.

18. A control apparatus according to claim 13, wherein said coupling effort control means is constituted by a disk type electromagnetic clutch having a clutch gap substantially equal to zero.

19. In a motor-driven power steering system for a motor vehicle which includes vehicle speed detecting means for detecting a speed of said motor vehicle, steering torque detecting means for detecting a steering torque applied to a steering mechanism of said motor vehicle, and an electric motor operatively coupled to said steering mechanism through the medium of coupling effort control means, wherein an assist torque is applied to said steering mechanism by driving said electric motor, an apparatus for controlling said motor-driven power steering system, comprising:

abnormal torque decision reference value arithmetic means for determining an abnormal torque decision reference value and a reference time in dependence on the vehicle speed detected by said vehicle speed detecting means;

assist torque determining means for determining assist torque applied by said electric motor;

load torque arithmetic means for arithmetically determining a load torque on the basis of a steering torque detected by said steering torque detecting means and on the determined assist torque;

torque comparison means for comparing said load torque with said abnormal torque decision reference value; and motor fault monitor/control means for stopping operation of said electric motor when said load torque exceeds said abnormal torque decision reference value and when duration in which said load torque exceeds said abnormal torque decision reference value is longer than said reference time while decreasing the coupling effort of said coupling effort control means.

20. A control apparatus according to claim 19, further comprising:

motor rotation decision means for deciding whether said electric motor is rotating or not;

wherein when said motor rotation decision means decides that said electric motor is rotating, operation of said motor fault monitor/control means is inhibited.

21. A control apparatus according to claim 19, further comprising:

motor voltage detecting means for detecting a voltage applied to said electric motor;

motor current detecting means for detecting a motor current flowing through said electric motor; and motor rotation decision means for estimating rotation number of said electric motor on the basis of said motor voltage and said motor current to thereby decide whether or not said electric motor rotates;

wherein operation of said motor fault monitor/control means is inhibited when said motor rotation decision means decides that said electric motor is rotating.

22. A control apparatus according to claim 19, further comprising:

motor regeneration voltage detecting means for detecting a voltage generated by said electric motor; and motor rotation decision means for deciding on the basis of the voltage whether or not said electric motor is rotating;

wherein operation of said motor fault monitor/control means is inhibited when said motor rotation decision means decides that said electric motor is rotating.

23. A control apparatus according to claim 19, further comprising:

motor rotation decision means for deciding whether said electric motor is rotating or not;

wherein for a predetermined time from the time point when said motor rotation decision means decided that said electric motor was rotating, operation of said motor fault monitor/control means is inhibited.

24. A control apparatus according to claim 19, wherein said coupling effort control means is constituted by a disk type electromagnetic clutch having a clutch gap substantially equal to zero.

25. In a motor-driven power steering system for a motor vehicle which includes vehicle speed detecting means for detecting a speed of said motor vehicle, steering torque detecting means for detecting a steering torque applied to a steering mechanism of said motor vehicle, and an electric motor operatively coupled to said steering mechanism through the medium of coupling effort control means, wherein an assist torque is applied to said steering mechanism by driving said electric motor, an apparatus for controlling said motor-driven power steering system, comprising:

abnormal torque decision reference value arithmetic means for determining an abnormal torque decision reference value in dependence on the vehicle speed detected by said vehicle speed detecting means;

load torque arithmetic means for arithmetically determining a load torque on the basis of at least a steering torque detected by said steering torque detecting means;

torque comparison means for comparing said load torque with said abnormal torque decision reference value; and motor fault monitor/control means for stopping operation of said electric motor when said load torque exceeds said abnormal torque decision reference value while controlling the coupling effort of said coupling effort control means so that the steering torque value detected by said steering torque detecting means does not exceed a predetermined value at which a steering wheel of said motor vehicle can be manipulated by a driver wherein said coupling effort control means comprises an electric clutch and wherein when the coupling effort of said coupling effort control means is decreased, said electric clutch assumes a semi-coupling state.

26. A control apparatus according to claim 25, further comprising:

motor rotation decision means for deciding whether said electric motor is rotating or not;

wherein when said motor rotation decision means decides that said electric motor is rotating, operation of said motor fault monitor/control means is inhibited.

27. A control apparatus for a motor-driven power steering system according to claim 25, further comprising:

motor voltage detecting means for detecting a voltage applied to said electric motor;

motor current detecting means for detecting a motor current flowing through said electric motor; and motor rotation decision means for estimating rotation number of said electric motor on the basis of said motor voltage and said motor current to thereby decide whether or not said electric motor rotates;

wherein operation of said motor fault monitor/control means is inhibited when said motor rotation decision means decides that said electric motor is rotating.

28. A control apparatus according to claim 25, further comprising:

motor regeneration voltage detecting means for detecting a voltage generated by said electric motor; and motor rotation decision means for deciding on the basis of said voltage whether or not said electric motor is rotating;

wherein operation of said motor fault monitor/control means is inhibited when said motor rotation decision means decides that said electric motor is rotating.

29. A control apparatus according to claim 25, further comprising:

motor rotation decision means for deciding whether said electric motor is rotating or not;

wherein for a predetermined time from the time point when said motor rotation decision means decided that said electric motor was rotating, operation of said motor fault monitor/control means is inhibited.

30. A control apparatus for a motor-driven power steering system according to claim 25, wherein said coupling effort control means is constituted by a disk type electromagnetic clutch having a clutch gap substantially equal to zero.

31. In a motor-driven power steering system for a motor vehicle which includes vehicle speed detecting means for detecting a speed of said motor vehicle, steering torque detecting means for detecting a steering torque applied to a steering mechanism of said motor vehicle, and an electric motor operatively coupled to said steering mechanism through the medium of coupling effort control means, wherein an assist torque is applied to said steering mechanism by driving said electric motor, an apparatus for controlling said motor-driven power steering system, comprising:

abnormal torque decision reference value arithmetic means for determining an abnormal torque decision reference value in dependence on the vehicle speed detected by said vehicle speed detecting means;

assist torque determining means for determining assist torque applied by said electric motor;

load torque arithmetic means for arithmetically determining a load torque on the basis of a steering torque detected by said steering torque detecting means and on the determined assist torque;

torque comparison means for comparing said load torque with said abnormal torque decision reference value; and motor fault monitor/control means for stopping operation of said electric motor when said load torque exceeds said abnormal torque decision reference value while controlling the coupling effort of said coupling effort control means so that the steering torque value detected by said steering torque detecting means does not exceed a predetermined value at which a steering wheel of said motor vehicle can be manipulated by a driver.

32. A control apparatus according to claim 31, further comprising:

motor rotation decision means for deciding whether said electric motor is rotating or not;

wherein when said motor rotation decision means decides that said electric motor is rotating, operation of said motor fault monitor/control means is inhibited.

33. A control apparatus according to claim 31, further comprising:

motor voltage detecting means for detecting a voltage applied to said electric motor;

motor current detecting means for detecting a motor current flowing through said electric motor; and motor rotation decision means for estimating rotation number of said electric motor on the basis of said motor voltage and said motor current to thereby decide whether or not said electric motor rotates;

wherein operation of said motor fault monitor/control means is inhibited when said motor rotation decision means decides that said electric motor is rotating.

34. A control apparatus according to claim 31, further comprising:

motor regeneration voltage detecting means for detecting a voltage generated by said electric motor; and motor rotation decision means for deciding on the basis of said voltage whether or not said electric motor is rotating;

wherein operation of said motor fault monitor/control means is inhibited when said motor rotation decision means decides that said electric motor is rotating.

35. A control apparatus according to claim 31, further comprising:

motor rotation decision means for deciding whether said electric motor is rotating or not;

wherein for a predetermined time from the time point when said motor rotation decision means decided that said electric motor was rotating, operation of said motor fault monitor/control means is inhibited.

36. A control apparatus for a motor-driven power steering system according to claim 31, wherein said coupling effort control means is constituted by a disk type electromagnetic clutch having a clutch gap substantially equal to zero.

37. In a motor-driven power steering system for a motor vehicle which includes vehicle speed detecting means for detecting a speed of said motor vehicle, steering torque detecting means for detecting a steering torque applied to a steering mechanism of said motor vehicle, and an electric motor operatively coupled to said steering mechanism through the medium of coupling effort control means, wherein an assist torque is applied to said steering mechanism by driving said electric motor, an apparatus for controlling said motor-driven power steering system, comprising:

abnormal torque decision reference value arithmetic means for determining an abnormal torque decision reference value and a reference time in dependence on the vehicle speed detected by said vehicle speed detecting means;

load torque arithmetic means for arithmetically determining a load torque on the basis of at least a steering torque detected by said steering torque detecting means;

torque comparison means for comparing said load torque with said abnormal torque decision reference value; and motor fault monitor/control means for stopping operation of said electric motor when said load torque exceeds said abnormal torque decision reference value and when duration in which said load torque exceeds said abnormal torque decision reference value is longer than said reference time while controlling the coupling effort of said coupling effort control means so that the steering torque value detected by said steering torque detecting means does not exceed a predetermined value at which a steering wheel of said motor vehicle can be manipulated by a driver.

38. A control apparatus according to claim 37, further comprising:

motor rotation decision means for deciding whether said electric motor is rotating or not;

wherein when said motor rotation decision means decides that said electric motor is rotating, operation of said motor fault monitor/control means is inhibited.

39. A control apparatus according to claim 37, further comprising:

motor voltage detecting means for detecting a voltage applied to said electric motor;

motor current detecting means for detecting a motor current flowing through said electric motor; and motor rotation decision means for estimating rotation number of said electric motor on the basis of said motor voltage and said motor current to thereby decide whether or not said electric motor rotates;

wherein operation of said motor fault monitor/control means is inhibited when said motor rotation decision means decides that said electric motor is rotating.

40. A control apparatus according to claim 37, further comprising:

motor regeneration voltage detecting means for detecting a voltage generated by said electric motor; and motor rotation decision means for deciding on the basis of said voltage whether or not said electric motor is rotating;

wherein operation of said motor fault monitor/control means is inhibited when said motor rotation decision means decides that said electric motor is rotating.

41. A control apparatus according to claim 37, further comprising:

motor rotation decision means for deciding whether said electric motor is rotating or not;

wherein for a predetermined time from the time point when said motor rotation decision means decided that said electric motor was rotating, operation of said motor fault monitor/control means is inhibited.

42. A control apparatus for a motor-driven power steering system according to claim 37, wherein said coupling effort control means is constituted by a disk type electromagnetic clutch having a clutch gap substantially equal to zero.

43. In a motor-driven power steering system for a motor vehicle which includes vehicle speed detecting means for detecting a speed of said motor vehicle, steering torque detecting means for detecting a steering torque applied to a steering mechanism of said motor vehicle, and an electric motor operatively coupled to said steering mechanism through the medium of coupling effort control means, wherein an assist torque is applied to said steering mechanism by driving said electric motor, an apparatus for controlling said motor-driven power steering system, comprising:

abnormal torque decision reference value arithmetic means for determining an abnormal torque decision reference value in dependence on the vehicle speed detected by said vehicle speed detecting means;

assist torque determining means for determining assist torque applied by said electric motor;

load torque arithmetic means for arithmetically determining a load torque on the basis of at least a steering torque detected by said steering torque detecting means and on the determined assist torque;

torque comparison means for comparing said load torque with said abnormal torque decision reference value; and motor fault monitor/control means for stopping operation of said electric motor when said load torque exceeds said abnormal torque decision reference value and when duration in which said load torque exceeds said abnormal torque decision reference value is longer than said decision reference time while controlling the coupling effort of said coupling effort control means so that the steering torque value detected by said steering torque detecting means does not exceed a predetermined value at which a steering wheel of said motor vehicle can be manipulated by a driver.

44. A control apparatus for a motor-driven power steering system according to claim 43, further comprising:

motor rotation decision means for deciding whether said electric motor is rotating or not;

wherein when said motor rotation decision means decides that said electric motor is rotating, operation of said motor fault monitor/control means is inhibited.

45. A control apparatus according to claim 43, further comprising:

motor voltage detecting means for detecting a voltage applied to said electric motor;

motor current detecting means for detecting a motor current flowing through said electric motor; and motor rotation decision means for estimating rotation number of said electric motor on the basis of said motor voltage and said motor current to thereby decide whether or not said electric motor rotates;

wherein operation of said motor fault monitor/control means is inhibited when said motor rotation decision means decides that said electric motor is rotating.

46. A control apparatus according to claim 43, further comprising:

motor regeneration voltage detecting means for detecting a voltage generated by said electric motor; and motor rotation decision means for deciding on the basis of said voltage whether or not said electric motor is rotating;

wherein operation of said motor fault monitor/control means is inhibited when said motor rotation decision means decides that said electric motor is rotating.

47. A control apparatus according to claim 43, further comprising:

motor rotation decision means for deciding whether said electric motor is rotating or not;

wherein for a predetermined time from the time point when said motor rotation decision means decided that said electric motor was rotating, operation of said motor fault monitor/control means is inhibited.

48. A control apparatus according to claim 43, wherein said coupling effort control means is constituted by a disk type electromagnetic clutch having a clutch gap substantially equal to zero.

* * * * *